Nov. 28, 1967   J. C. FARQUHAR   3,354,973
PLATFORM MOUNT FOR WEIGHING MACHINES
Filed Aug. 12, 1965   3 Sheets-Sheet 1
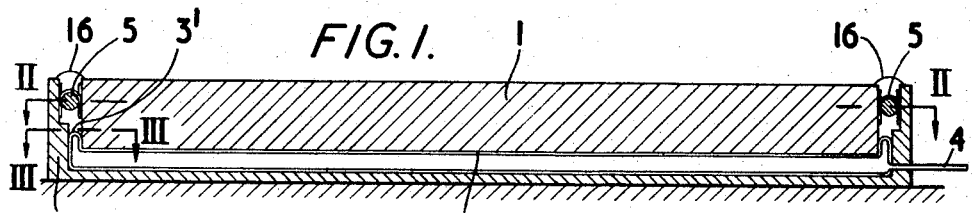
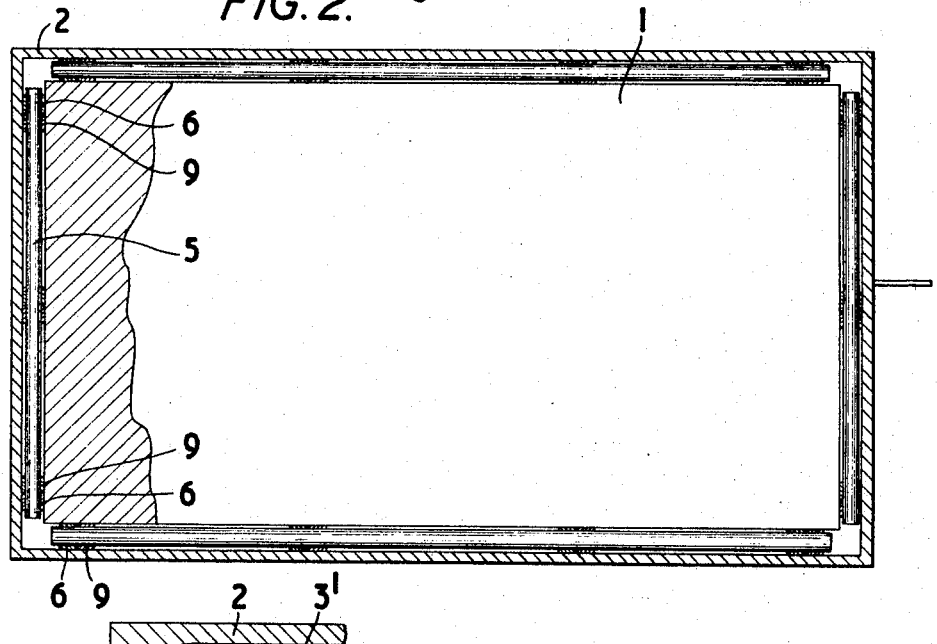
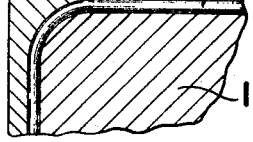
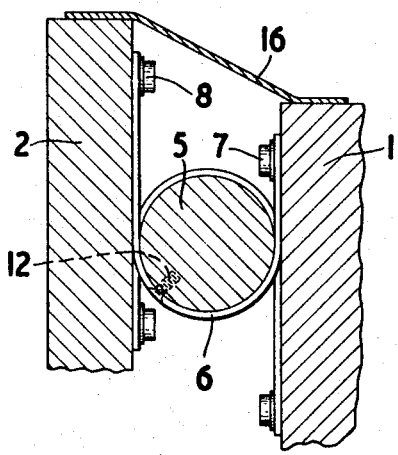
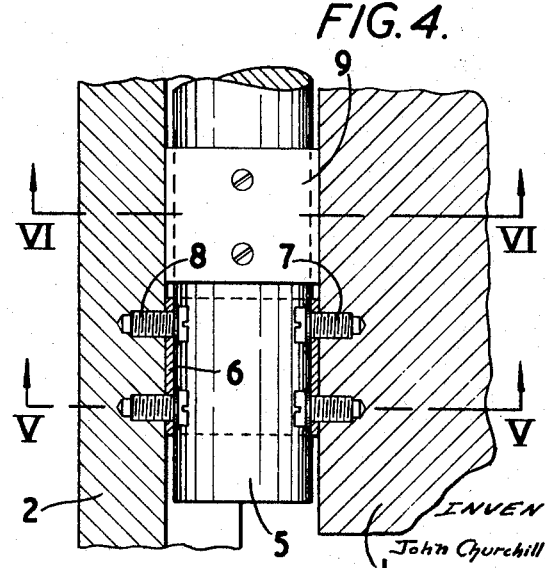

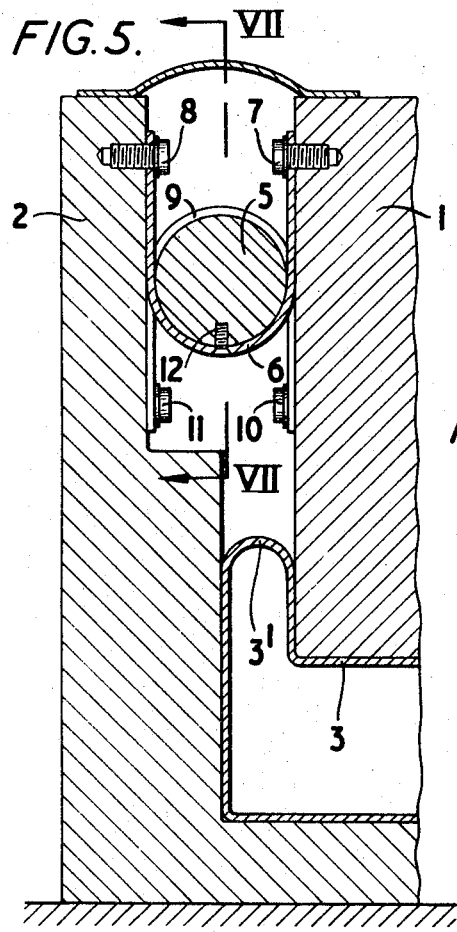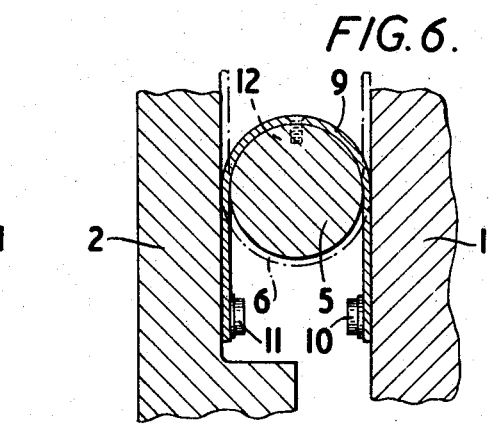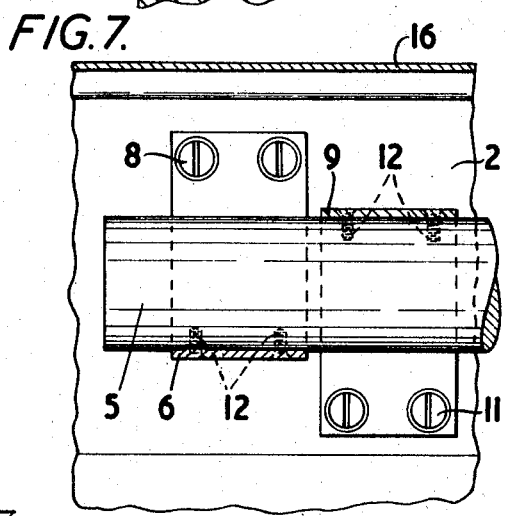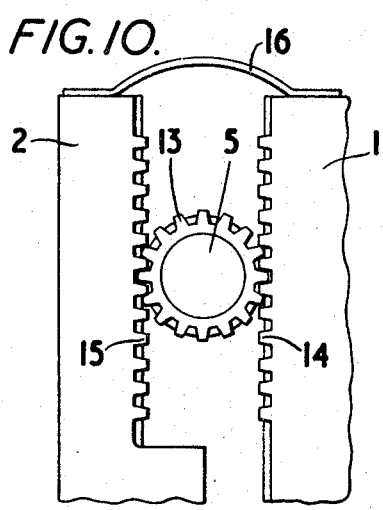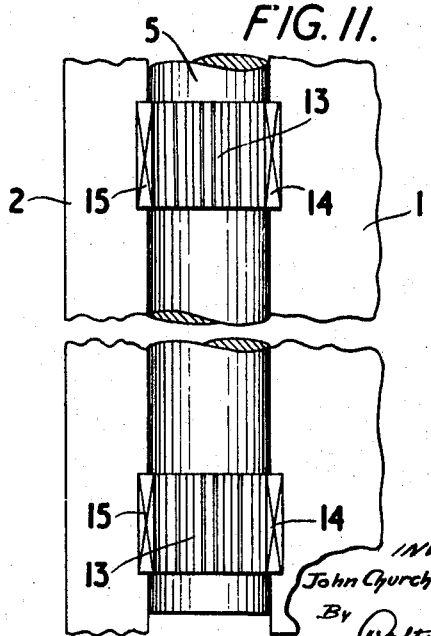

Nov. 28, 1967
J. C. FARQUHAR
3,354,973
PLATFORM MOUNT FOR WEIGHING MACHINES
Filed Aug. 12, 1965
3 Sheets-Sheet 3
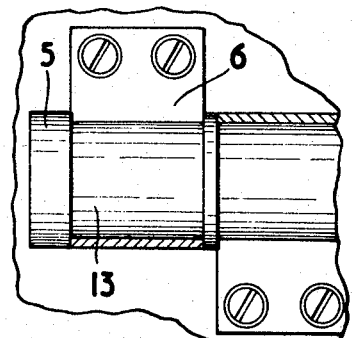
FIG.9.
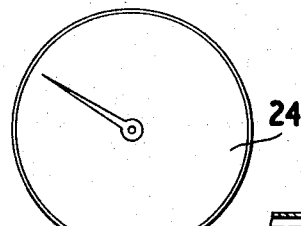
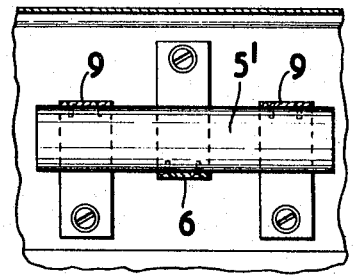
FIG.13.
FIG.12.
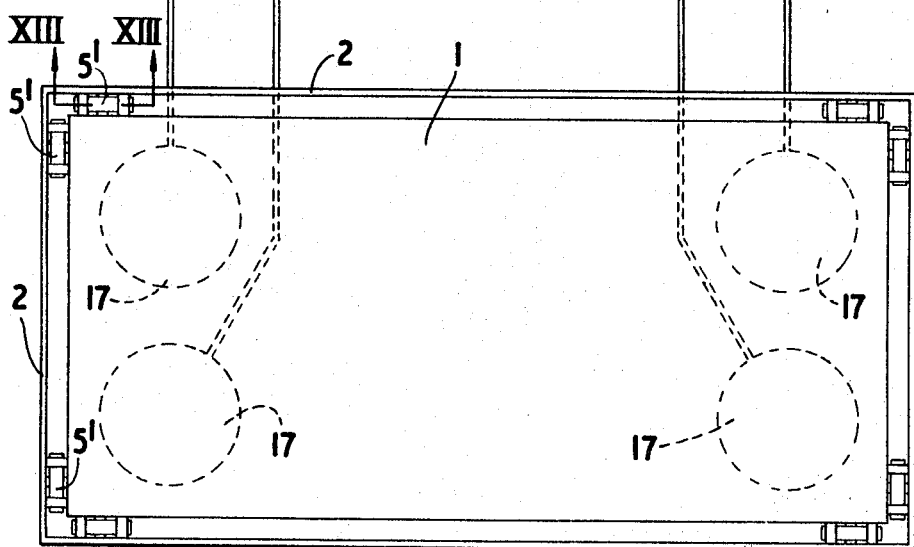

United States Patent Office 3,354,973
Patented Nov. 28, 1967

3,354,973
PLATFORM MOUNT FOR WEIGHING MACHINES
John Churchill Farquhar, 53 Oakley St.,
London SW. 3, England
Filed Aug. 12, 1965, Ser. No. 479,165
8 Claims. (Cl. 177—208)

The present invention relates to weighing machines (including weighbridges as well as platform machines) of the kind in which a load platform is supported upon one or more hydraulic or pneumatic load cells (hereinafter called "pressure capsules") adapted to transmit a pressure or pressures equivalent to the load through a pipe or pipes to a load measuring device such as, for example, one or more pressure-receiver capsules mechanically connected to a conventional spring or lever balanced weight-measuring means.

More specifically the invention relates to means for guiding and locating the load platform or pressure capsules so that horizontal motion of the platform or of the moving parts of the pressure capsules is prevented, whilst vertical motion is permitted with very little friction and without the imposition of vertical forces which could be caused, for example, by angularity of locating links.

It is known that the rolling diaphragm type of pressure capsule maintains constant effective area, and it may be designed to have negligible hysteresis. For these reasons it is the most suitable type of pressure capsule for use in accurate hydraulic weighing systems. However, the load-bearing or movable part of such a pressure capsule must be centred and guided with respect to the stationary part in order to prevent sliding friction and damage to the rolling diaphragm itself.

The guiding means must be capable of withstanding side loads (horizontal forces) caused, for example, by vehicles stopping and starting on the load platform of a weighbridge. For accurate weighing, the guiding means must not impose sliding friction upon the movable parts of the pressure capsule, and must not resolve horizontal forces into vertical and horizontal components.

According to the present invention, in a weighing machine of the kind referred to, guiding means are provided for the platform or for the moving part of a pressure capsule consisting of rolling rods located, with their axes horizontal, between the platform and its housing or between the movable and stationary parts of a pressure capsule.

For each load platform, or for each pressure capsule, an arrangement of three or more horizontal rods must be used to withstand horizontal forces in any direction. Preferably there are four rods arranged in a rectangle or square so as to roll between vertical surfaces provided on the moving and stationary parts.

The rods are constrained so that there is pure rolling motion between the rods and the vertical surfaces on the moving and stationary parts. The constraint may be in the form of rack-and-pinion gearing on the rods and vertical surfaces, such that the pitch circle of the gearing is equal to the diameter of the rod. Alternatively the constraint may be in the form of reversed flexible straps looped around half of the circumference of the rods in opposition, one end of each strap being fixed to the moving part of the load platform or pressure capsule, and the other end being fixed to the stationary part.

In one embodiment of the invention, the middle portion of each looped strap is fixed to the periphery of the rolling rod so that parallel motion is imposed on the rod when a pair of such opposing looped straps are fitted at either end of the rod. In another embodiment, the straps are not attached to the rolling rods, but are guided by grooves or recesses cut in the periphery of the rods.

The straps may be metal flexure strips, wire cords, chains, or textile or woven metal cloth strips.

FIGURE 1 of the accompanying drawings is a diagrammatic sectional view through the platform and its housing and pressure cell of a platform weighing machine, having platform guiding means in accordance with the present invention.

FIGURE 2 is a plan view, partly in section on line II—II, FIGURE 1, of the platform and its guiding means.

FIGURE 3 is a fragmentary horizontal section through one corner, on line III—III, FIGURE 1.

FIGURE 4 is a plan view, upon a larger scale, of the guiding means employed in connection with the platform.

FIGURE 5 is a cross-section on line V—V, FIGURE 4.

FIGURE 6 is a cross-section on line VI—VI, FIGURE 4.

FIGURE 7 is a longitudinal section on line VII—VII, FIGURE 5.

FIGURE 8 is an end elevation of the guiding means showing the position of the roll after the platform has been depressed from its fully raised position shown in FIGURE 5.

FIGURE 9 shows an alternative means of preventing aixal movement of the roller.

FIGURE 10 is an end elevation showing a rack-and-pinion device for giving the parallel guiding action of the platform.

FIGURE 11 is a plan view of this device.

FIGURE 12 is a plan view showing an arrangement in which the platform is mounted upon four separate pressure capsules connected to four pressure receiver capsules of the load measuring device.

FIGURE 13 is a section, on a larger scale of the guiding device shown in FIGURE 12, being taken on line XIII—XIII of that figure.

Referring to FIGURES 1 to 8 of the said drawings, the rectangular platform 1 of a platform weighing machine (or of a weighbridge) is vertically movable within a housing 2 and is supported upon a single large pressure capsule consisting of a flexible flat bag 3 containing a hydraulic or pneumatic fluid and having around its periphery a folded portion $3^1$ located between the platform and its housing so as to constitute a rolling diaphragm. It will be seen from FIGURE 3 that the corners of the platform and housing, and also of the diaphragm $3^1$, are radiused to allow the diaphragm to roll freely. A pressure equivalent to the load on the platform is generated in the bag and this pressure is transmitted through a pipe 4 (FIGURE 1) to a load-measuring device, for example, to an arrangement similar to that shown in FIGURE 12 and hereinafter described, except that only one pressure receiver capsule would be employed.

Instead of the platform being supported upon a bag, this bag may be omitted and the edges of the platform connected to the walls of the housing by means of rolling flexbile diaphragms of known form, the space below the platform being filled with a hydraulic or pneumatic fluid to constitute a load cell or pressure capsule, and the pressure thereof being transmitted to the measuring device by a pipe 4 as before.

In order to guide the platform in its vertical movement under load and to ensure that it moves with a true parallel motion without tipping, even with the load off-centre, four rolling rods 5 are disposed between the respective four vertical sides of the platform and the opposed vertical walls of the housing. These rods extend the full length of each side of the platform and centre and guide the latter, being constrained to roll without slipping and with a true parallel motion by being supported and controlled by a plurality of pairs of relatively reversed flexible looped straps disposed at spaced positions along the length of each rod. Each pair of straps comprises a strap 6 looped in U-formation beneath the rod to support the same sling-wise, its ends extending upwardly over the rod 5 and being fixed to the platform 1 and housing 2 at points 7, 8, respectively; and a second strap 9 reversed with respect to strap 6, being looped in U-formation closely around the top of the rod, its ends extending downwardly over the rod and being fixed to the platform 1 and fixed to the platform 1 and housing 2 at points 10, 11, respectively.

As the platform descends under load the rods are positively caused to roll downwards, without slipping, by reason of the straps 6 being lowered at the one side whilst the other strap 9 is drawn down at the same side, so that the two straps at all times remain in close contact with the roller, one below and the other above. The manner of rolling of the straps is shown in FIGURE 8 which shows their position after the platform has descended from the position shown in FIGURE 6. When the platform ascends, the strap 6 lifts the roller whilst the strap 9 rolls upwardly with the roller. Endwise movement of the rods is prevented and parallel motion ensured by fixing the middle portion of each strap to the roller by means of welding or by pins, screws or the like, as at 12; or to prevent endwise movement, each strap may run in a groove 13 in the roller 5, as shown in FIGURE 9.

The straps 6, 9, may be made of flexible metal strips, textile or woven cloth strips, or they may take the form of wire cords or chains.

In place of the reversed looped straps in FIGURES 1 to 9, the rods may be controlled by rack-and-pinion gearing. Thus, as shown in FIGURES 10 and 11, each rod 5 carries two toothed pinions 13, 13, each meshing with a toothed rack 14 on the platform 1 and with a toothed rack 15 on the housing 2. The pitch circle of the pinions is equal to the diameter of the rods which are constrained to roll, with pure rolling motion, on surfaces in line with the pitch line of the racks 14 and 15. The top of the space between the platform 1 and housing 2 may be closed by a flexible cover 16 which flexes during movement of the platform.

In the arrangement shown in FIGURES 12 and 13, the load platform 1 is guided in the housing 2 by rods and reversed looped straps, but instead of using long rods, only short rods 5¹ are used, there being at least two such rods at spaced points along the sides and ends of the platform. In this case, where short rods are used, three looped straps are used for each rod, as shown in FIGURE 13, two straps 9, 9, passing over the top of each rod, and an intermediate strap 6 passing underneath, the straps being fixed to the rods at their mid points. The platform 1 is mounted upon four separate pressure capsules 17 individually connected by pipes 18 to four pressure receiver capsules 19 each comprising an outer casing 20 fixed to a stationary frame and a movable plunger member 21 connected to the casing 20 by a rolling diaphragm, the pipes 18 delivering the pressure fluid into the outer casing so as to depress the plunger member 21. All four plunger members 21 are connected by a movable stirrup or frame 22, so that they move in unison, and the latter is connected to the operating member 23 of the weighing head 24 of a conventional weighing machine, so that the total force exerted by the four pressure receiver capsules 19 is transmitted to the weighing head. There may be more than four pressure capsules and their corresponding pressure receiver capsules.

Tipping of the platform is prevented by reason of the four or more capsules on which it is supported and which are connected to individual pressure receiver capsules constrained to move in unison, so that it is necessary only to guide and centre the platform, hence the use of short rolling rods instead of long rods.

In addition to, or instead of the rolling rods between the platform and its housing, similar rolling rods may be provided between the inner and outer relatively movable portions of the pressure capsules 17 which are essentially of the same form as the pressure receiver capsules 19 with inner and outer members connected by a rolling diaphragm. To facilitate the use of the rolling rods the said capsules 17 may be of rectangular form with the rolling rods applied to the pressure capsules. No further centreing or guiding of the platform is needed. The rolling rods may be applied either inside or outside the rolling diaphragm.

I claim:

1. A weighing machine comprising a vertically-movable load-controlled member, a co-operating stationary part, a rolling diaphragm between said movable member and stationary part to form a fluid-containing pressure capsule, a load measuring device connected to said capsule, and guiding means for the vertically-movable member consisting of rolling rods located, with their axes horizontal, between opposed side surfaces of said movable member and stationary part.

2. A weighing machine as claimed in claim 1, wherein the rolling rods are associated with means whereby they are constrained to roll with a true parallel motion without slipping.

3. A weighing machine including a vertically-movable load-controlled member, a co-operating stationary part having side walls opposed to the sides of the said load-controlled member, rolling guide rods between said sides of the movable member and the side walls of the stationary part and constraining means for said rollers consisting of relatively-reversed U-shaped flexible straps attached at opposite ends respectively to the sides of the vertically-movable member and the side walls of the stationary part, at least one strap passing under a rod to support the same and at least one other strap passing over the rod in close contact therewith.

4. A weighing machine as claimed in claim 3, wherein the straps are fixed to the rods at their middle portions.

5. A weighing machine comprising a rectangular load platform, a pressure capsule supporting the platform, a load measuring device connected to the pressure capsule, a housing within which the platform is vertically movable, and guiding means for the platform consisting of long rolling rods extending along substantially the full length of each side of said platform and in contact with a side wall of the housing, said rods being constrained by pairs of relatively-reversed flexible straps attached at opposite ends respectively to the platform and to the housing, one strap of each pair passing under a rod and the other passing over the rod, said pairs of straps being located at spaced portions along the length of each rod.

6. A weighing machine comprising a rectangular load platform, a pressure capsule, including relatively movable and stationary members, for supporting the platform, a load measuring device connected to the pressure capsule, a stationary housing within which the platform is vertically movable, and guiding means for the platform consisting of a plurality of short rolling rods along the length of each side of said platform and in contact with a side wall of the housing, said rods being constrained by at least three looped straps having their opposite ends connected respectively to the platform and to the housing, certain of the straps passing under the rod and certain of them passing over said rod.

7. A weighing machine including a vertically-movable load-controlled member, a co-operating stationary part having side walls opposed to the sides of the said load-controlled member and rolling rods between said sides of the movable member and the side walls of the stationary part, said rods being provided with toothed pinions meshing with two racks respectively on the vertically-movable member and on the opposed stationary part.

8. A weighing machine comprising a vertically-movable load platform, a stationary housing for said platform, a plurality of pressure capsules, including relatively-movable and stationary parts connected by a rolling diaphragm for supporting the platform, a plurality of pressure receiver capsules consisting of stationary and movable members and each connected by a pipe to a pressure capsule, means whereby the movable parts of all the pressure receiver capsules are compelled to move in unison, means for operatively connecting said movable parts to weight-measuring means and horizontal rolling rods between opposed side surfaces of relatively-movable parts of the machine.

References Cited

UNITED STATES PATENTS

| 1,070,460 | 8/1913 | Harback | 177—255 |
| 1,790,509 | 1/1931 | Moyer | 177—257 |
| 2,352,934 | 7/1944 | Bohannan | 177—208 |

FOREIGN PATENTS

| 178,033 | 4/1922 | Great Britain. |
| 372,955 | 11/1920 | Germany. |

STEPHEN J. TOMSKY, *Primary Examiner.*

RICHARD B. WILKINSON, *Examiner.*

GEORGE H. MILLER, JR., *Assistant Examiner.*